A. H. MOORHOUSE.
NOISE MAKING APPARATUS.
APPLICATION FILED JAN. 14, 1913.

1,103,217.

Patented July 14, 1914.
6 SHEETS—SHEET 1.

WITNESSES
C. E. Parsons
H. L. Alden

Albert H Moorhouse
INVENTOR

BY Spear, Middleton, Donaldson Spear
ATTORNEY

A. H. MOORHOUSE.
NOISE MAKING APPARATUS.
APPLICATION FILED JAN. 14, 1913.

1,103,217.

Patented July 14, 1914.
6 SHEETS—SHEET 2.

WITNESSES
C. E. Parsons
H. L. Alden

INVENTOR
Albert H Moorhouse
BY
Spear, Middleton, Donnelson & Spear
ATTORNEY

A. H. MOORHOUSE.
NOISE MAKING APPARATUS.
APPLICATION FILED JAN. 14, 1913.

1,103,217.

Patented July 14, 1914.
6 SHEETS—SHEET 3.

WITNESSES
C E Parsons
H. L. Alden

INVENTOR
Albert H Moorhouse
BY
Spear Middleton, Donaldson Spear
ATTORNEY

A. H. MOORHOUSE.
NOISE MAKING APPARATUS.
APPLICATION FILED JAN. 14, 1913.

1,103,217.

Patented July 14, 1914.
6 SHEETS—SHEET 4.

WITNESSES
C E Parsons
H L Alden

INVENTOR
Albert H Moorhouse
BY
Spear, Middleton, Donaldson & Spear
ATTORNEY

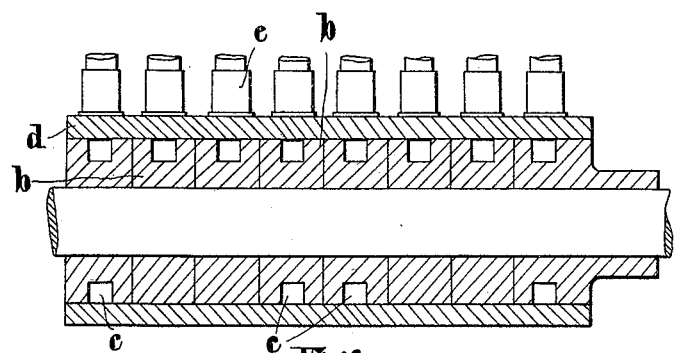
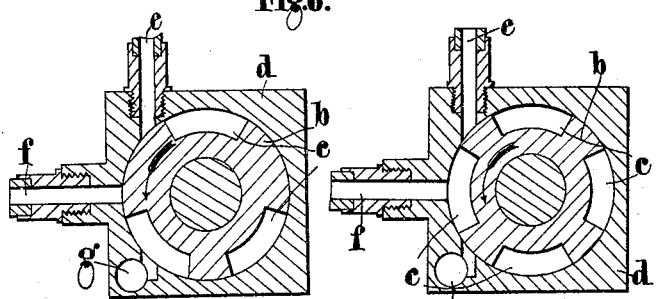
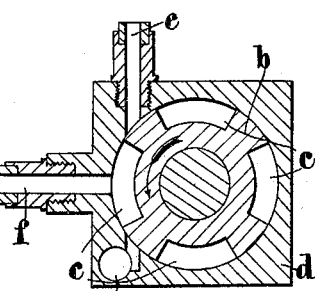
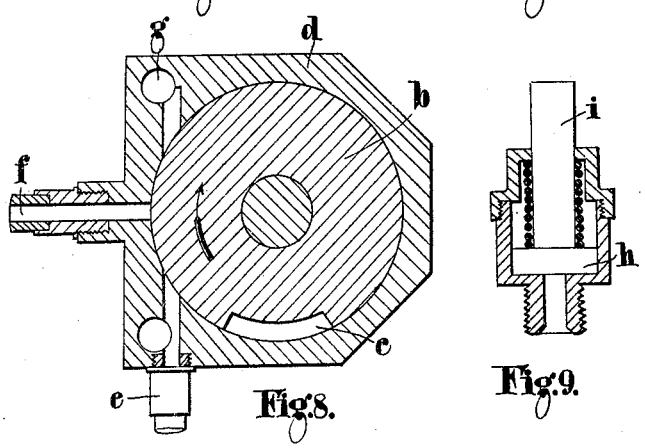
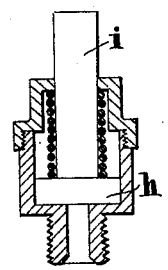

A. H. MOORHOUSE.
NOISE MAKING APPARATUS.
APPLICATION FILED JAN. 14, 1913.

1,103,217.

Patented July 14, 1914.
6 SHEETS—SHEET 6.

UNITED STATES PATENT OFFICE.

ALBERT HARRISON MOORHOUSE, OF STALEYBRIDGE, ENGLAND.

NOISE-MAKING APPARATUS.

1,103,217.

Specification of Letters Patent. Patented July 14, 1914.

Application filed January 14, 1913. Serial No. 742,036.

*To all whom it may concern:*

Be it known that I, ALBERT HARRISON MOORHOUSE, a subject of the King of Great Britain and Ireland, residing at Victoria Works, Staleybridge, in the county of Chester, England, have invented certain new and useful Improvements in Noise-Making Apparatus, of which the following is a specification.

This invention relates to apparatus for producing various sound effects for theatrical and like purposes and has for its object to provide improved means for the automatic production of the required sounds under the controlling action of an operator, such means allowing if necessary of the operator being situated at a distance from the apparatus itself.

Figure 1:
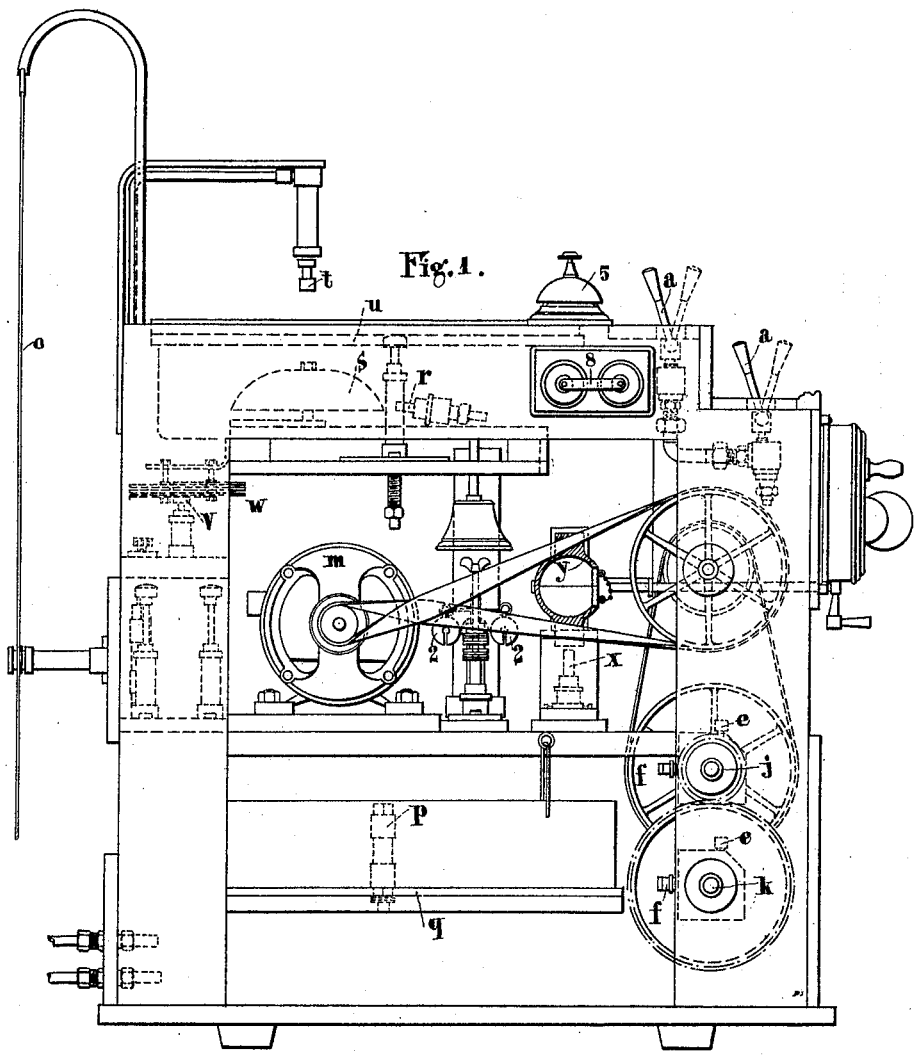
Figure 2:
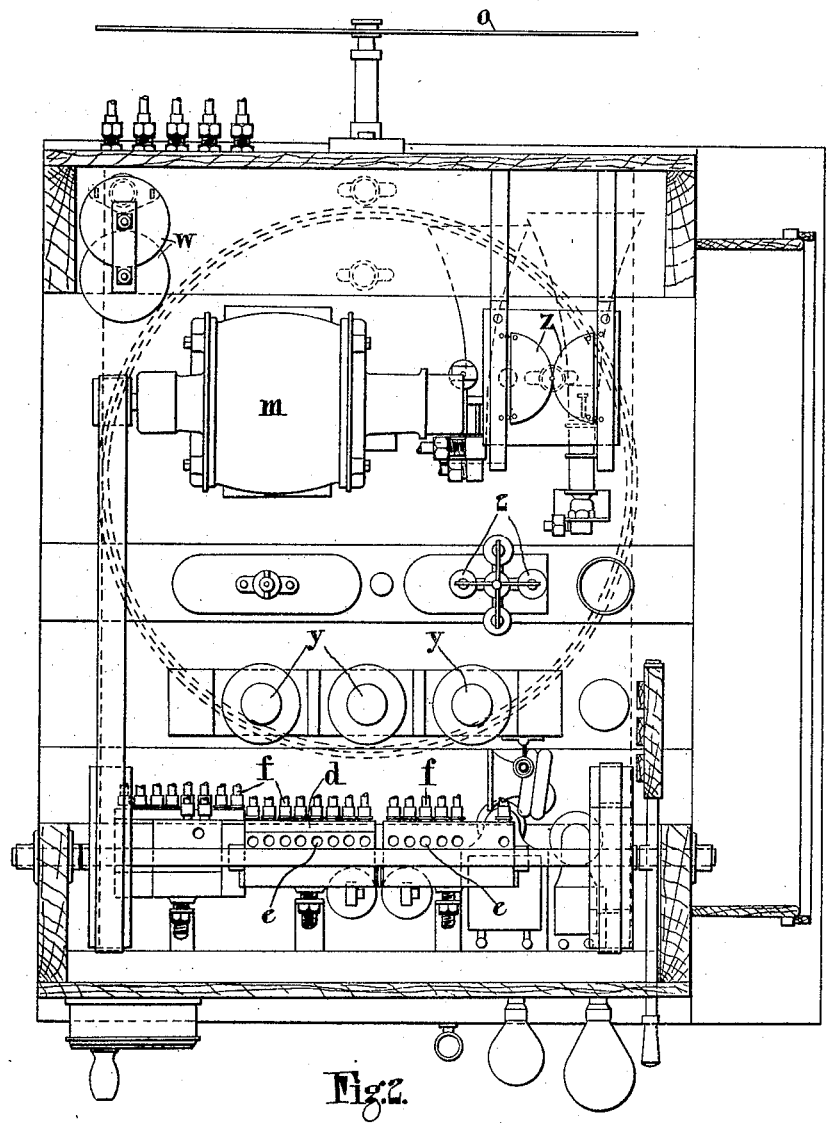
Figure 3:
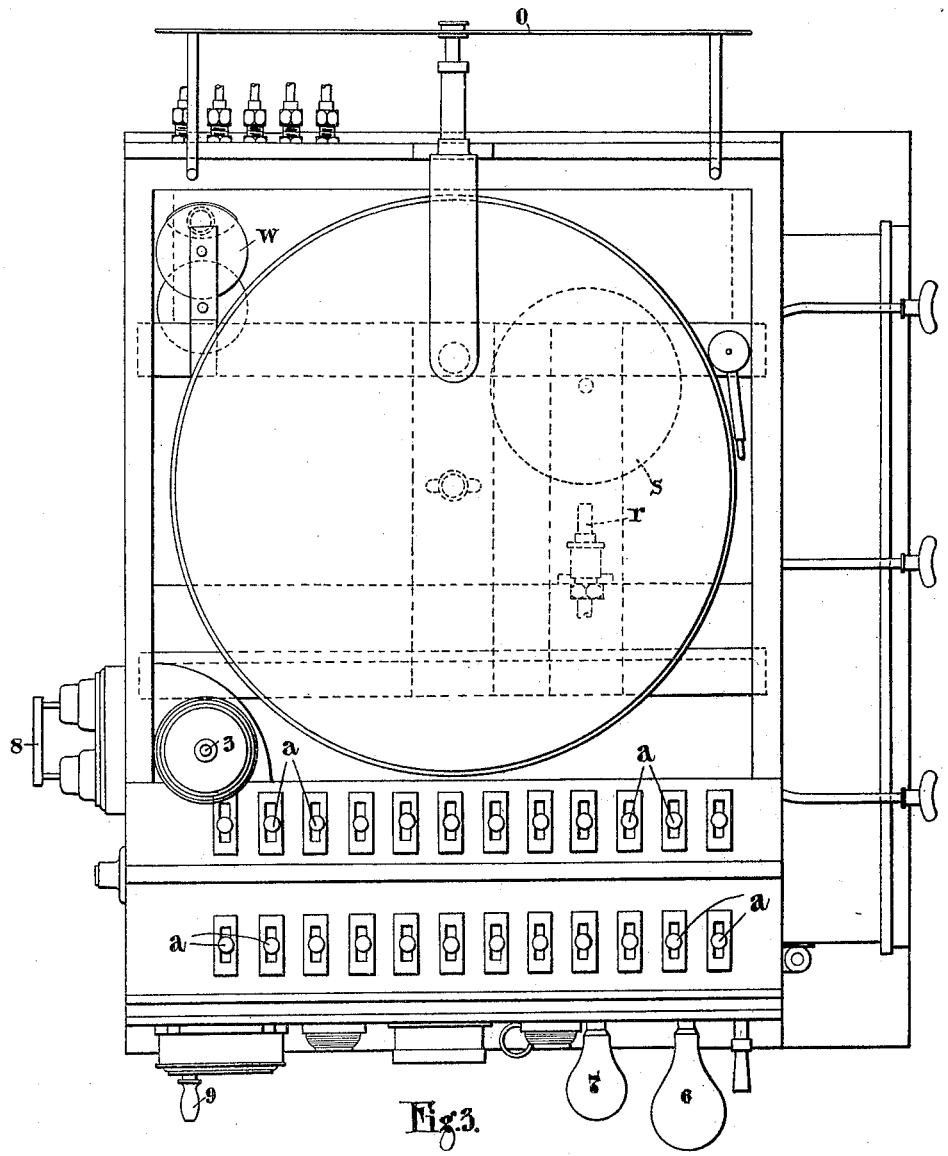
Figure 4:
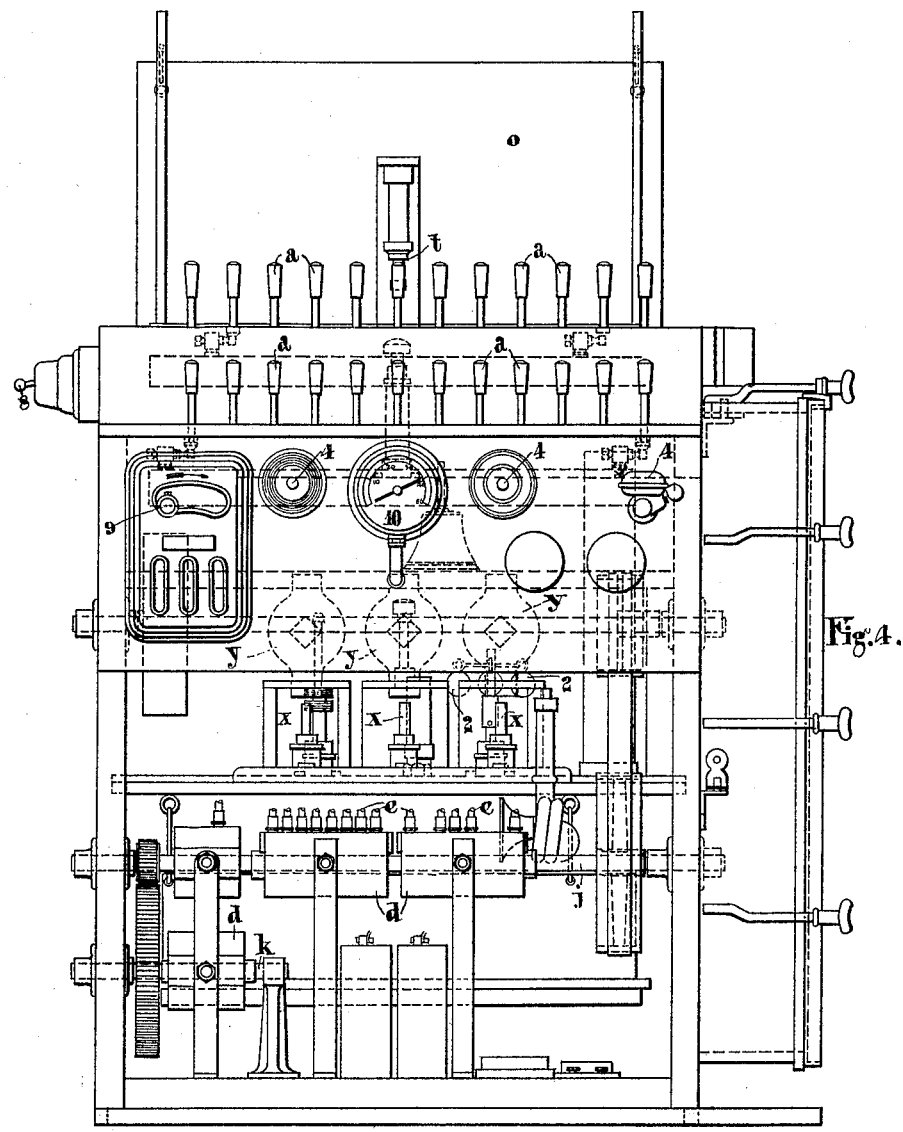
Figure 10:
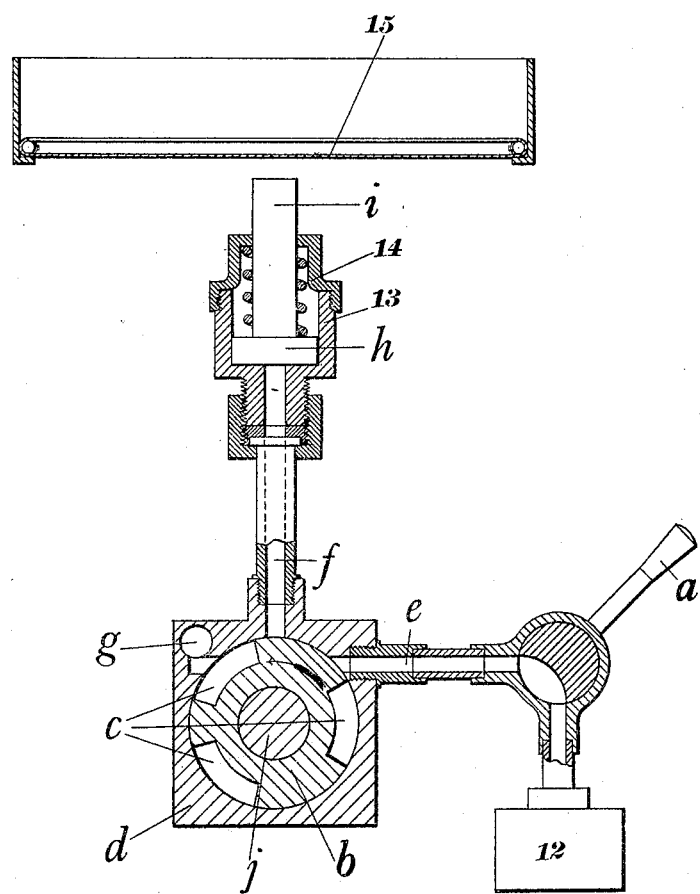

Referring to the accompanying sheets of explanatory drawings:—Figure 1 is an end elevation, Fig. 2 a sectional plan view, Fig. 3 a plan view and Fig. 4 a front elevation of a sound producing apparatus constructed in accordance with my invention. Figs. 5, 6, 7, 8 and 9 are detail views drawn to an enlarged scale, to be hereinafter referred to. Fig. 10 is a diagrammatic view of the control fittings for one sound producing device.

The same reference letters in the different views indicate the same parts.

In the illustrated application of my invention the apparatus is operated by compressed air, as has been previously proposed, the flow of air to the various parts of the apparatus being controlled by valves or cocks $a$ actuated from a keyboard or like part in charge of the operator (see Figs. 1, 3 and 4). Between said valves or cocks and the part of the apparatus by which the sound is produced I provide a series of rotating disk valves $b$ (see Figs. 5 to 8), each having one or more grooves or recesses $c$ in its surface. Each disk $b$ rotates within a casing $d$ having compressed air inlet, compressed air outlet and exhaust connections $e$, $f$ and $g$ respectively, the arrangement being such that when the disk rotates compressed air can, if allowed by the opening of the proper valve or cock $a$, flow through the inlet $e$ and the slot $c$ in the disk $b$ to the compressed air outlet $f$ and so to the cylinder inclosing the plunger, vibrating or rapidly reciprocating piston or like part by which the sound producing device is operated. The further rotation of the disk allows the compressed air to escape from the outlet $f$ to the exhaust connection $g$. The cycle of operations is then repeated. Any convenient number of slots may be provided in each disk and same may be so positioned with relation to one another that any desired sequence or timing of operations of the sound producing devices may be obtained. In the arrangement shown at Fig. 5, three slots $c$ are provided, that at Fig. 7 has four slots and that at Fig. 8 one slot only.

The disks $b$ are mounted upon shafts or spindles $j$, $k$ (see Fig. 4), the short spindle $k$ being geared to rotate at a slower rate than the spindle $j$. The means for driving the spindles $j$ and $k$ from the electric motor $m$ are clearly shown in Fig. 1.

Fig. 10 shows diagrammatically the arrangement of the control fittings for one sound producing device, the complete apparatus comprising a plurality of the arrangements shown in Fig. 10 but each in connection with a different sound producer. The source of compressed air is indicated by 12. The air supply which is controlled by the valve $a$ is led to a valve casing $d$ containing a continuously rotating disk valve $b$ having peripheral grooves $c$ therein. The said valve casing also has a connection to a piston cylinder 13 containing a piston $h$ held in the position shown by a spring 14. The piston rod may for example be adapted to strike a drum skin 15. An exhaust connection $g$ leads from the valve casing $d$. Assuming that the valve $a$ is open, as shown, and the disk valve $c$ is rotating in the direction of the arrow; when a groove $c$ places the passage $e$ in communication with $f$, the compressed air will force the piston $h$ outward and the rod $i$ will strike the skin 15. As the valve $b$ continues to rotate, the groove $c$ will put the passage $f$ into communication with the exhaust port $g$ and the spring 14 will return the piston $h$ to the position shown. A similar cycle of operations will be performed three times in each complete revolution of the valve $b$ due to the three grooves $c$ in its periphery, the number of the piston movements being governed by the speed of the valve $b$.

For the operation of the device whereby the sound of a peal of bells is produced, I arrange a series of disks $b$ (as shown at Fig. 8) in a manner similar to that illustrated at Fig. 6, with the slots $c$ so positoined relatively to one another that the hammers or equivalent parts striking the tubular or other bells are operated in succession. The compressed air actuates plungers as $h$, Fig. 9, which cause the strikers or rods $i$ to engage the bells. By varying the dispositions of the disks and therefore of the slots $c$ relatively to one another, I can vary the order of the sounds produced. The passage of air to the control valves or disks $b$ is regulated by one valve $a$, the air however flowing to said disks through several tubes $e$.

The keyboard or like part from which the air valves or cocks $a$ are controlled, may be fitted in any convenient position, independent of or separate from the main apparatus, but is connected to the latter by air conduits which communicate with the casings $d$ containing the continuously rotating valves $b$ above referred to. In cases where a continuous flow of compressed air is required for operating any part such as for blowing a whistle, the supply of air passes direct from the control valves to the instrument in the known manner. The continuously rotating valves $b$ before described, provide for the intermittent operation of the required parts and also regulate the period of such operations.

For producing the sound of a motor car, I employ a reciprocating piston (see Fig. 9) of known form and arrangement operated by the compressed air and connected to a metallic or other sheet or plate $o$ (see Fig. 1) which it causes to vibrate.

To produce the sound of water falling, as in a waterfall, I secure a cylinder $p$ (Fig. 1) to a drum skin $q$ on which a number of pellets or like parts are placed. As the piston vibrates the drum skin with the pellets is also vibrated and the required sound produced. Or a piece of chain mail may be moved over the drum skin and pellets.

The rapidly reciprocating or single acting pistons operated by the compressed air may operate in conjunction with many different forms of sound producing devices. Thus the striker $r$, Fig. 1, operates a bell $s$; the striker $t$, the drum $u$; the striker $v$, the metal plates $w$; the strikers $x$, the hinged cup-like members $y$ which separate and come together again and produce the sound of a horse running or galloping. The hingedly mounted plates $z$, Fig. 2, are operated by a compressed air actuated piston, as are also the bells 2.

My improved apparatus is fitted with the usual continuously ringing and other bells as 3, 4 and 5; with motor and like horns 6, 7; with an electric switch 8 for the motor and with a rheostat 9. It has also a pressure gage 10 for the compressed air which may be supplied by compressors through a storage vessel or receiver.

With my apparatus, by varying the amount of opening of the valves or cocks $a$, I vary the force of the blows transmitted to the sound producing devices by the pistons or strikers and also the rate of reciprocation of the vibrating or rapidly reciprocating pistons. The rate of rotation of the valve $b$ is controlled by the rheostat 9. Instead of employing a plurality of separate rotating disks $b$ (see Fig. 6), I may form the same all in one piece.

Having now described my invention what I claim as new and desire to secure by Letters Patent is:—

1. In sound producing appartus for theatrical and like purposes, the combination with compressed air supplying means and a sound producing device, of a hand actuated valve and also a continuously operated power actuated valve for controlling and regulating the flow of compressed air between said means and device, as set forth.

2. In sound producing apparatus for theatrical and like purposes, the combination with compressed air supplying means, of hand actuated valves arranged in close proximity to one another, continuously rotating disk valves each having at least one slot therein, a casing around said disk valves, inlet, outlet and exhaust connections to said casing, and piston like elements in communication with said outlet connections, the compressed air passing in series through said hand actuated valves and continuously rotating disk valves on its way to said piston-like elements, as set forth.

3. In sound producing apparatus for theatrical and like purposes, the combination with compressed air supplying means, of a hand actuated valve controlling the compressed air supply, a plurality of continuously operated disk valves receiving compressed air from said hand actuated valves, and a series of piston like elements each controlled by one of the disk valves, the said continuously operated valves supplying compressed air to said piston like elements in series, the compressed air passing in series through said hand actuated valves and continuously operated valves to the piston like elements, as set forth.

4. In sound producing apparatus for theatrical and like purposes, the combination with compressed air supplying means, of hand actuated valves receiving compressed air from said means, a plurality of continuously operated disk valves receiving compressed air from said hand actuated valves, a series of piston like elements each receiving compressed air from one of the disk valves, and sound producing devices actuated by said piston like elements, as set forth.

In testimony whereof I have signed my name to this specification in the presence of two subscribing witnesses.

ALBERT HARRISON MOORHOUSE.

Witnesses:
ARTHUR HUGHES,
HILDA HUGHES.

Copies of this patent may be obtained for five cents each, by addressing the "Commissioner of Patents, Washington, D. C."